Aug. 7, 1934.   A. L. HOPKINS   1,969,007

STORAGE BATTERY

Filed April 2, 1930   2 Sheets-Sheet 1

Inventor
Albert L. Hopkins
By Spencer Hardman & Fehr
His Attorneys

Aug. 7, 1934.  A. L. HOPKINS  1,969,007
STORAGE BATTERY
Filed April 2, 1930  2 Sheets-Sheet 2

Inventor
Albert L. Hopkins

By Spencer Hardman & Fehr
His Attorneys

Patented Aug. 7, 1934

1,969,007

UNITED STATES PATENT OFFICE 1,969,007

STORAGE BATTERY

Albert L. Hopkins, Muncie, Ind., assignor, by mesne assignments, to General Motors Corporation, Detroit, Mich., a corporation of Delaware Application April 2, 1930, Serial No. 440,946

5 Claims. (Cl. 136—134)

This invention relates to storage batteries, and more particularly to the type of storage battery used in automotive vehicles propelled by an internal combustion engine.

One of the objects of the present invention is to reduce the cost of manufacture and the weight of the storage battery by a construction requiring the minimum amount of lead for the intercell connectors.

Further objects and advantages of the present invention will be apparent from the following description reference being had to the accompanying drawings wherein a preferred embodiment of one form of the present invention is clearly shown.

Figure 1:
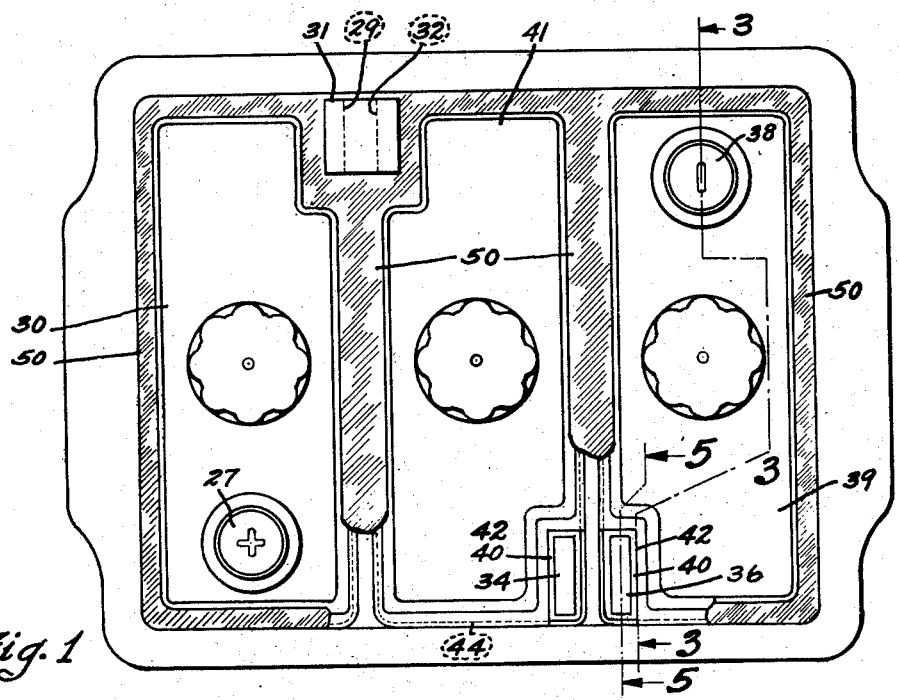
Fig. 1 is a plan view of a storage battery embodying the present invention, the sealing compound for sealing the cell covers having been omitted in certain portions in order to show the construction.
Figure 2:
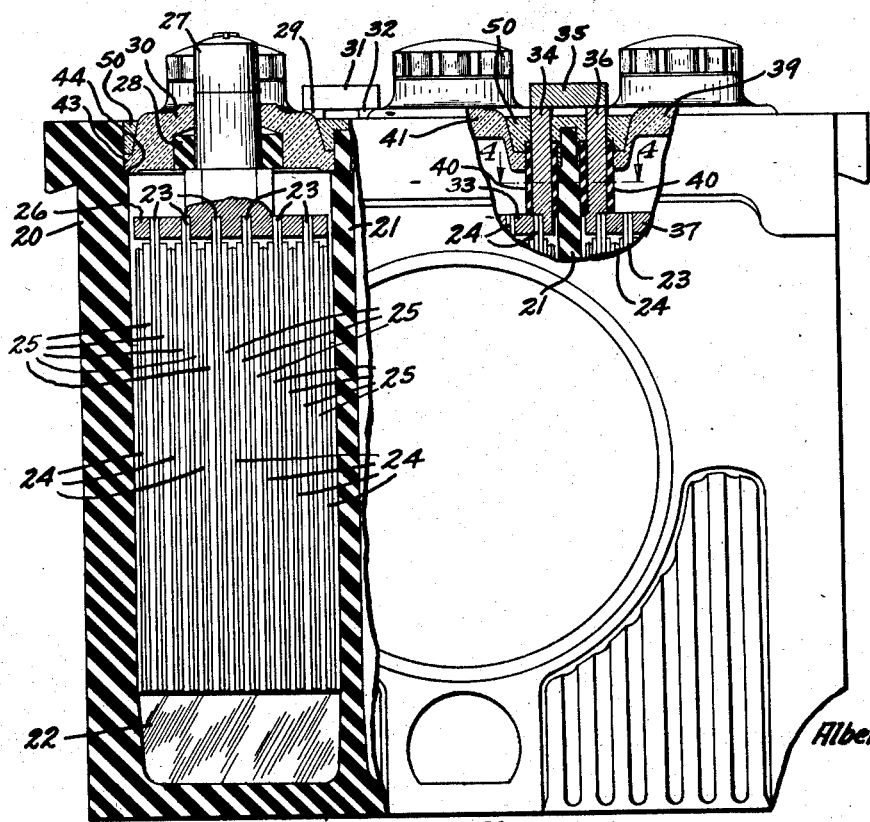
Fig. 2 is a side elevation partly in section of the storage battery shown in Fig. 1.
Figure 3:
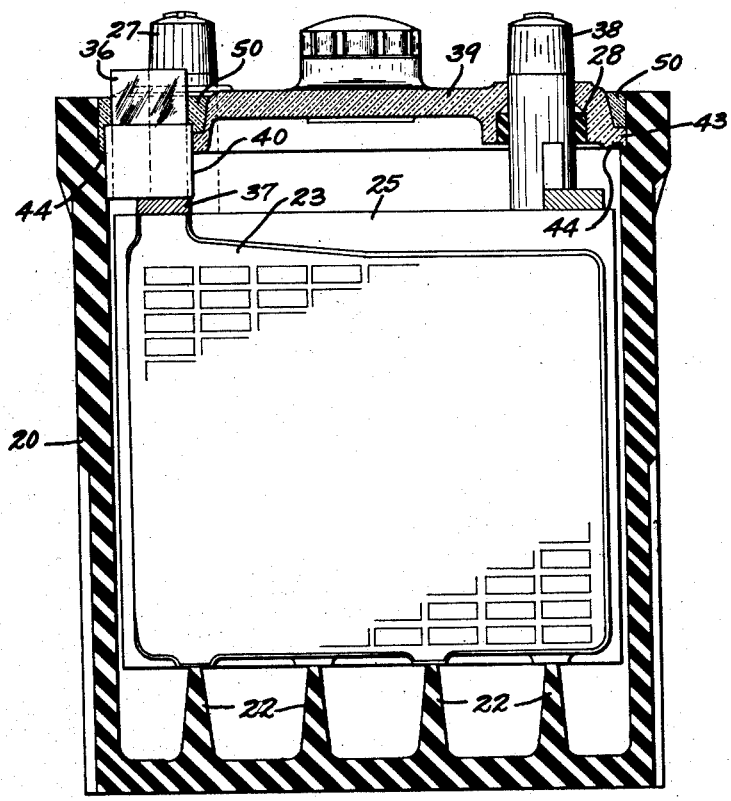
Fig. 3 is a sectional view on the line 3—3—3—3 of Fig. 1.
Figure 4:
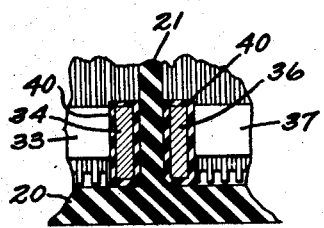
Fig. 4 is a sectional view on the line 4—4 of Fig. 2.
Figure 5:
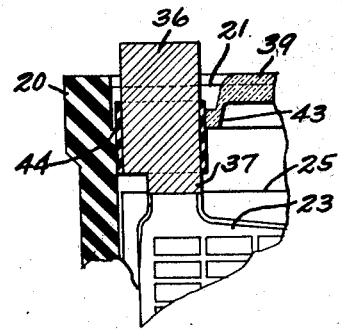
Fig. 5 is a fragmentary sectional view on the line 5—5 of Fig. 1.

The battery jar 20 has integral partitions 21 dividing the jar into three cells and integral ridges 22 upon which rests the cell unit assembly. Each cell unit assembly comprises a set of positive grids 23 alternating with a set of negative grids 24 and separated by wooden separator plates 25. These sets of grids are joined to suitable lugs having integral terminal posts as viewed in Figs. 1 and 2. The left hand cell contains positive grids attached to a lug 26 having an integral positive terminal post 27 extending upwardly through the cell covers 30 and through a soft rubber ring 28 which tends to prevent leakage of electrolyte. The negative grids 24 of the left hand cell are connected to a lug having an integral terminal post 29, the cross section of which is no greater than sufficient for properly conducting current between the cells. The terminal 29 is connected by a strap 31 with a terminal post 32 which is integral with the lug connected with the positive grids in the intermediate cell. The negative grids 24 of the intermediate cell are connected with a lug 33 integral with a terminal post 34 which is connected by a strap 35 with a terminal post 36 integral with a lug 37 which is connected with the positive grids 23 of the right hand cell as viewed in Figs. 1 and 2. The negative grids 24 of the right hand cell are connected with a lug having a terminal post 38 extending through the cell cover 39 for the right hand cell.

The battery end terminals 27 and 38 to which conductors may be attached may be cast hollow in order to save material and reduce weight. The method of manufacturing these terminal lugs, however, does not of itself constitute a part of the present invention.

As stated before, the present invention consists chiefly in providing a construction whereby the amount of material required for intercell connectors will be reduced to the minimum. Accordingly, the intercell terminal posts 29, 32, 34 and 36 and the intercell straps 31 and 35 have cross sectional dimensions no greater than required for mechanical strength and for the purpose of conducting current between the cells. The intercell terminal posts are located as close as possible in the corners of the cells and are spaced from the cell partitions and cell end walls only by an amount sufficient to accommodate a soft rubber sleeve 40 which is placed around each intercell terminal post before the cell units are placed in the cells. When the cell units have been placed in the cells, these rubber sleeves 40 will bear firmly against the cell partitions and end walls and therefore provide a support for the sealing compound which is applied after the covers have been placed upon the cells.

The end cell covers 30 and 39 and the intermediate cell cover 41 have marginal portions which are provided with notches or openings 42, the edge surfaces of which bear firmly against the rubber sleeves 40 when the cell covers are located with their flanges 43 resting upon the ledges 44 which extend around the four walls of each battery cell. It is apparent, therefore, that each rubber sleeve 40 fills in the space between the intercell terminal post and the cell cover as well as between the intercell terminal posts and the walls of the cell. These sleeves, therefore, provide a support for the sealing compound 50 which is poured upon the flanges 43 of the cell covers and the top surfaces of the cell partitions 21 when this compound is poured into the channels provided between the raised portions of the cell covers and the side walls of the battery box.

The sleeves 40 also perform another function. Since these sleeves 40 tightly grip the surfaces of the intercell posts they tend to prevent the leakage of electrolyte upwardly along the posts. These sleeves also provide a yielding connection between the metal posts and the adjacent covers and sealing material and thus minimize the likelihood of disrupting the seal between the intercell terminal posts and cell covers and walls when the battery is put into service in an automotive vehicle.

After the covers have been sealed in place, the intercell strap 31 is connected to the upper end of the intercell posts 29 and 32, and the strap 35 is connected with the posts 34 and 36. These connections are made, preferably, by a burning operation with the aid of an acetylene torch.

While the form of embodiment of the present invention as herein disclosed, constitutes a preferred form, it is to be understood that other forms might be adopted, all coming within the scope of the claims which follow.

What is claimed is as follows:

1. A storage battery comprising, in combination, a plurality of cells, a cover for each cell having a marginal portion provided with an opening adjacent one of the cell walls, a group of plates within each cell, a terminal post connected with the plates of one cell and extending upwardly therefrom through the opening in the cover of said one cell, said post being adapted to be connected to a similar post extending upwardly through the opening in the cover of an adjacent cell, a sleeve of resilient acid-resisting material closely surrounding each post and engaged by a cell wall adjacent thereto and by the edge of the cover opening through which it extends, each sleeve extending above the marginal portion provided with the opening through which it extends, and sealing compound between the covers and the cell walls and about the posts and the sleeves.

2. A storage battery comprising, in combination, a cell, a group of plates within the cell, a terminal post connected with said plates and extending upwardly adjacent a corner of the cell in close proximity to the cell walls, a sleeve of resilient acid-resisting material closely surrounding the post and engaging the contiguous walls of the cell, a cover for the cell having a notch providing clearance for the terminal the edge walls of the notch bearing against the sleeve when the cover is in position, and sealing compound between the cover and the cell walls and about the post and the sleeve.

3. A storage battery comprising, in combination, a cell the side walls of which provide a continuous ledge spaced below the top of the cell and set back from the main side wall surfaces of the cell, a cover having a flange adapted to be supported by said ledge below the top of the cell and having a raised portion which is spaced from the side walls of the cell when the cover is in position for the purpose of receiving a sealing compound, a group of plates within the cell, a strap connecting the plates and integral with a terminal post located in one corner of a cell and extending upwardly in close proximity to the side and end walls of the cell, a sleeve of resilient acid-resisting material surrounding the terminal posts and bearing against the side walls of the cell below the ledge but spaced from the side walls above the ledge, said cover having a notch through which the post and sleeve extend the edge walls of the notch bearing against the sleeve when the cover is in position, the space between the sleeve and the side wall portions of the cell above the ledge and the space between the sleeve and the raised portion of the cover providing for the reception of sealing compound which covers the upper end of the sleeve.

4. A storage battery comprising, in combination, a plurality of cells, a plurality of covers one for each cell, a group of plates within each cell, a terminal post connected with the plates of one cell and extending upwardly therefrom adjacent a corner of the cell in close proximity to the cell walls, said post adapted to be connected to a similar terminal post in similar position in an adjacent cell, each of said cell covers having a notch providing an opening between its edge and the cell walls through which a terminal post extends, a sleeve of cushioning acid-resisting material closely surrounding each terminal post and engaging the contiguous walls of the cell and the edge of the notch in the cover, and sealing compound between the covers and the cell walls and about the posts and the sleeves.

5. A storage battery comprising a cell including a cover having an opening, a group of plates within the cell, a terminal post connected to the plates and extending upwardly near a wall of the cell and through the opening in the cover, a sleeve of cushioning acid-resisting material engaging the walls of the opening in the cover and closely surrounding the terminal post, said sleeve also engaging the cell wall near the terminal post and extending between the terminal post and the adjacent cell wall, and sealing compound between the cover and the cell walls and about the post and the sleeve.

ALBERT L. HOPKINS.